D. M. BUIE,
Assignor, by mesne assignments, to J. B. WHITEHEAD, G. McK. BAIN, E. M. STODDARD, O. E. MALTBY, and G. DICK.
PROCESS OF MANUFACTURING OILS FROM ORGANIC SUBSTANCES.
No. 10,338. Reissued June 5, 1883.
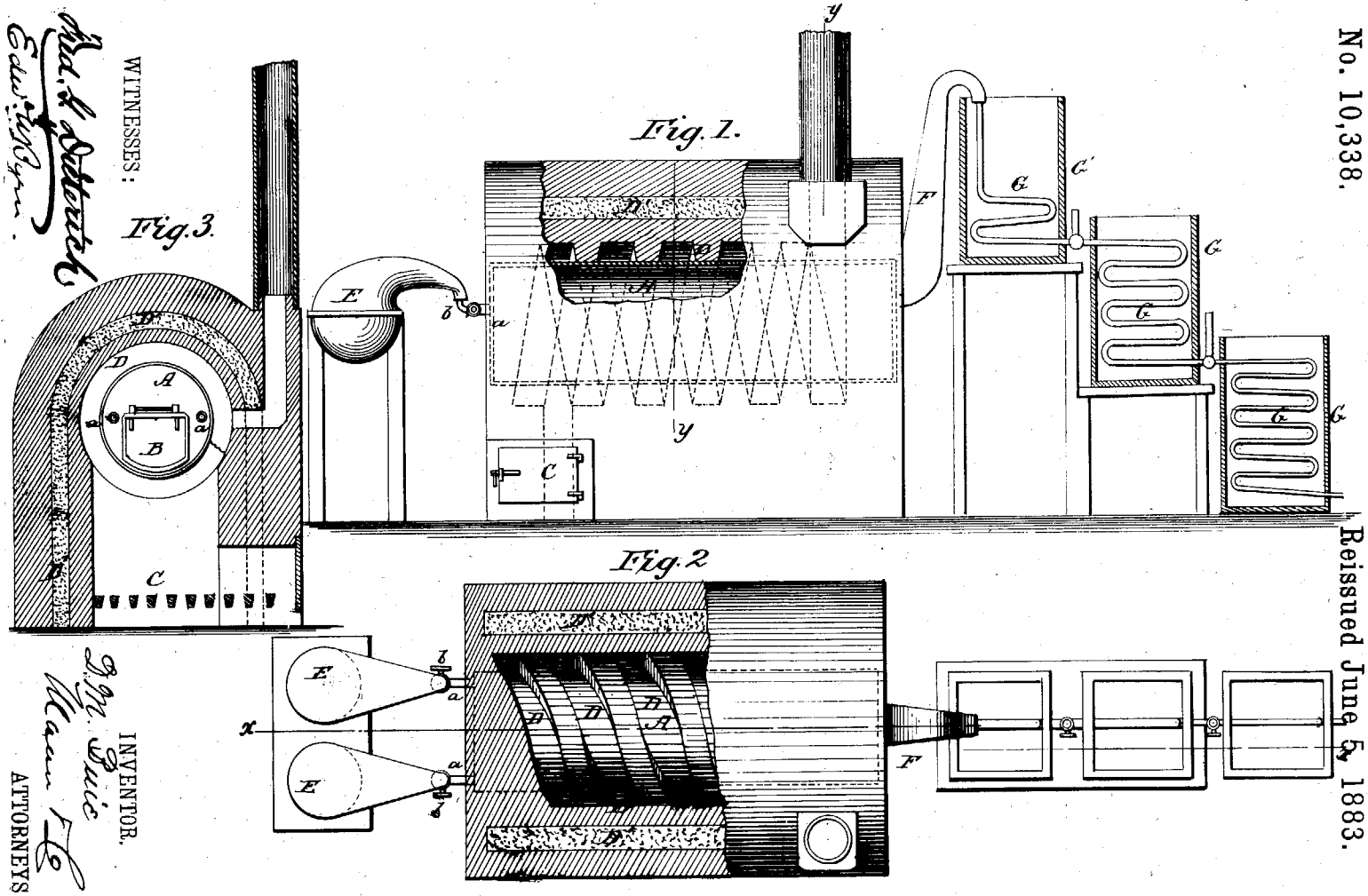
WITNESSES:
Fred. L. Dieterich
Edw. M. Byrn
INVENTOR.
D. M. Buie
Mann & Co
ATTORNEYS

UNITED STATES PATENT OFFICE.

DUNCAN M. BUIE, OF WILMINGTON, NORTH CAROLINA, ASSIGNOR, BY MESNE ASSIGNMENTS, TO JOHN BOSWELL WHITEHEAD, GEORGE McKENDREE BAIN, EVAN MORGAN STODDARD, OLIVER ELLSWORTH MALTBY, AND GEORGE DICK, ALL OF NORFOLK, VIRGINIA.

PROCESS OF MANUFACTURING OILS FROM ORGANIC SUBSTANCES.

SPECIFICATION forming part of Reissued Letters Patent No. 10,338, dated June 5, 1883.

Original No. 200,168, dated February 12, 1878. Application for reissue filed April 30, 1883.

*To all whom it may concern:*

Be it known that I, DUNCAN M. BUIE, of Wilmington, in the county of New Hanover and State of North Carolina, have invented a new and useful Improvement in the Manufacture of Oils from Organic Substances, such as pitch-pine, sassafras, juniper, myrtle, peanuts, cotton-seed, &c.; and I do hereby declare that the following is a full, clear, and exact description of the same, reference being had to the accompanying drawings, forming part of this specification, in which—

Figure 1 represents a side elevation, partly in section on line *x x*, Fig. 2, of the apparatus employed in the manufacture of oils from organic substances. Fig. 2 is a top view, partly in horizontal section; and Fig. 3 is a vertical transverse section of the same on line *y y*, Fig. 1.

The invention will first be described in connection with the drawings, and then pointed out in the claim.

In the drawings, A represents a boiler or retort of cylindrical shape, to be charged through a lid B. The cylinder A is heated by a furnace, C, placed near the charging end of the cylinder, the fire passing along its entire length, and the gases of combustion being drawn off through a smoke-stack or chimney at the opposite end.

D is a reverberatory flue arranged around cylinder, and connected by an opening with the furnace. It runs diagonally over and down the whole circumference on both sides of the cylinder, and thence along the wall, returning over and across the cylinder four or more times, opening finally into the chimney. Above the brick-work of the reverberatory flue D is a layer or covering, D′, of sand.

The cylinder or retort A is charged through the end door, B, with the organic substances, and also through pipes *b a* at both sides of the door with steam and carbonic-acid gas, so as to throw the gases into the materials and increase thereby the yield and quality of the product.

The operation is as follow: Fill the cylinder A with pitch-pine, sassafras, juniper, myrtle, peanuts, or cotton-seeds, or other oil-containing substances, make the connection with condenser, and build the fire in furnace, as in the old method of destructive distillation to make pyroligneous acid. The retorts E E contain five gallons each, one being nearly filled with water, which is made to boil by the application of heat. The vapor generated is conducted into the large retort, which is heated nearly red-hot, and the hydrogen liberated. The other retort E is charged with ten quarts of water, two pounds of carbonate of ammonia, and thirty-two ounces of vitriol, (60° strength,) the latter being applied by drops through a tube. The measure of acid will decompose the carbonate of ammonia and liberate carbonic-acid gas, which enters the retort A, while the sulphate of ammonia that is also formed remains in the retort. The oil-vapors are conducted, by a goose-neck or cap, F, at the rear end of the cylinder A, into a suitable coil, G, of a condensing-tank, G′, then to a second worm and tank below the same, and to a third worm and tank below the former. The goose-neck F is made with convex sides and flat surfaces at the upper and lower sides. The tanks are connected by pipes provided with gas-cocks and exit-pipes, the pipe between the second and third tank being intended to draw off the gas to a purifier, when desired, for illuminating purposes, that between the first and second tanks serving as a safety-cock for the purpose of relieving the worms of undue pressure. The condensing worms and tanks cool off and finally discharge the oil, which, by the more effective action of the heat on the boiler, in connection with the ingredients charged to and embodied in the oil, produce a product of superior quality and increased quantity.

Having thus described my invention, what I claim as new is—

The process of manufacturing oil from organic substances—such as pitch-pine, sassafras, juniper, myrtle, peanuts, cotton-seed, and other oil-containing substances—which consists in injecting steam and carbonic-acid gas into the retort containing the materials and heated to a high temperature, as specified.

DUNCAN M. BUIE.

Witnesses:
BENJ. F. KING,
CHAS. R. DAVIS.